United States Patent [19]

Koller

[11] Patent Number: 5,059,085

[45] Date of Patent: Oct. 22, 1991

[54] TRAILER WITH TILTABLE BED(S)

[76] Inventor: Ernest H. Koller, S. 2721 Post St., Spokane, Wash. 99210

[21] Appl. No.: 407,438

[22] Filed: Sep. 14, 1989

[51] Int. Cl.⁵ .............................................. B60P 1/28
[52] U.S. Cl. .................................... 414/482; 414/469; 280/425.1; 280/479.1
[58] Field of Search ............... 414/430, 469, 482, 483, 414/484, 485, 437; 280/425.1, 479.1, 490.1

[56] References Cited

U.S. PATENT DOCUMENTS

| | | |
|---|---|---|
| 2,610,865 | 9/1952 | Cantrell . |
| 2,740,543 | 4/1956 | Mounsdon et al. . |
| 2,876,922 | 3/1959 | Holiday . |
| 2,969,989 | 1/1961 | Struthers . |
| 2,995,399 | 8/1961 | Riseborough ...................... 414/483 |
| 3,018,906 | 1/1962 | Franklin ............................. 414/476 |
| 3,032,218 | 5/1962 | Grigonis ............................ 414/476 |
| 3,065,871 | 11/1962 | Schramm . |
| 3,179,271 | 4/1965 | Donahue . |
| 3,232,464 | 2/1966 | Bogh et al. . |
| 3,497,232 | 2/1970 | Richey . |
| 3,633,776 | 1/1972 | Moore . |
| 3,731,831 | 5/1973 | Huff . |
| 3,746,195 | 7/1973 | Beilke et al. ...................... 414/476 |
| 3,807,593 | 4/1974 | Bourton ......................... 414/483 X |
| 3,837,665 | 9/1974 | Schramm . |
| 3,894,747 | 7/1975 | Wisdom et al. ................ 414/482 X |
| 4,019,643 | 4/1977 | Kampman et al. . |
| 4,023,852 | 5/1977 | Clark . |
| 4,044,906 | 8/1977 | Schrag et al. ...................... 414/485 |
| 4,051,967 | 10/1977 | Sedgwick ........................... 414/483 |
| 4,054,226 | 10/1977 | Bjelland et al. . |
| 4,124,136 | 11/1978 | Bjelland et al. . |
| 4,130,211 | 12/1978 | Abascal . |
| 4,136,791 | 1/1979 | Clark . |
| 4,168,932 | 9/1979 | Clark ................................ 414/483 |
| 4,215,963 | 8/1980 | Doner . |
| 4,259,034 | 3/1981 | Ward et al. . |
| 4,273,351 | 6/1981 | Salamander . |
| 4,278,375 | 7/1981 | Drake et al. .................. 414/483 X |
| 4,318,656 | 3/1982 | Ezell .............................. 414/483 X |
| 4,494,766 | 1/1985 | McHugh et al. . |
| 4,515,510 | 5/1985 | Heward et al. . |
| 4,568,235 | 2/1986 | Bills, Jr. . |
| 4,578,014 | 3/1986 | Colet . |
| 4,579,362 | 4/1986 | Kirkpatrick . |
| 4,602,399 | 7/1986 | Jenkins . |
| 4,627,780 | 12/1986 | Munz . |
| 4,704,062 | 11/1987 | Hale . |
| 4,711,499 | 12/1987 | Fortin . |
| 4,730,974 | 3/1988 | Andre . |
| 4,746,261 | 5/1988 | Landoll et al. . |
| 4,789,289 | 12/1988 | Wilson . |

FOREIGN PATENT DOCUMENTS

| | | | |
|---|---|---|---|
| 2719072 | 1/1979 | Fed. Rep. of Germany ...... 414/485 |
| 1091001 | 2/1956 | France ............................. 280/425.1 |
| 0003390 | 10/1983 | World Int. Prop. O. .......... 414/483 |

Primary Examiner—David A. Bucci
Assistant Examiner—James W. Keenan

[57] ABSTRACT

A trailer with tiltable beds which makes loading and unloading easier. More particularly, a trailer with a wheeled undercarriage, a towbar, a frame which is releasably attached to and suspended from the towbar and a platform that can be tilted downward at both the front end and the rear end of the trailer.

4 Claims, 11 Drawing Sheets

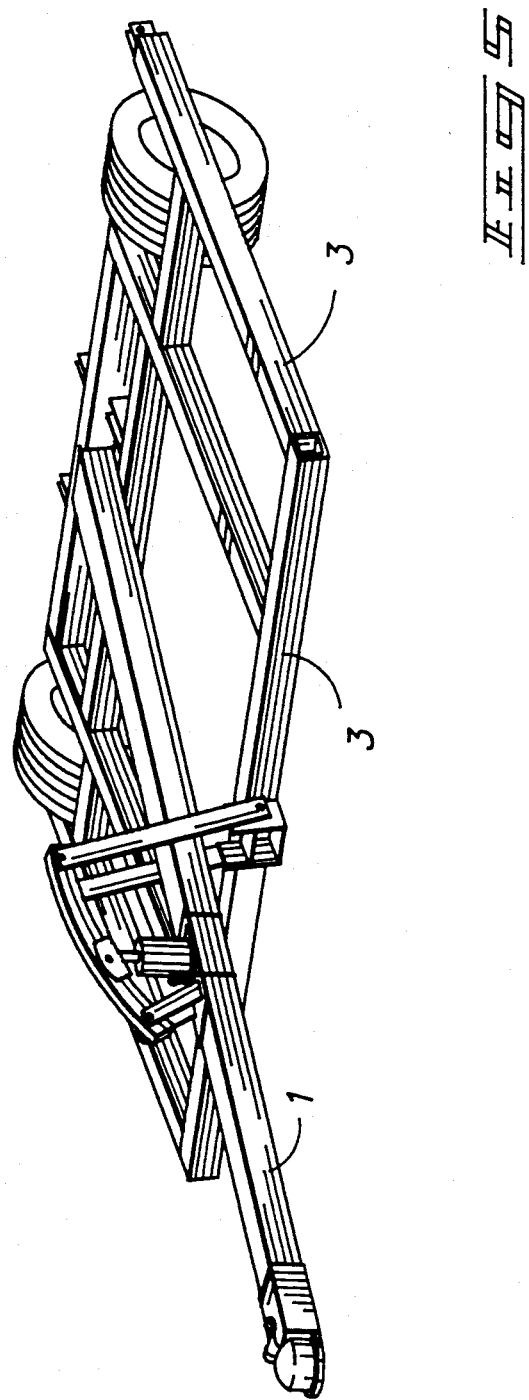

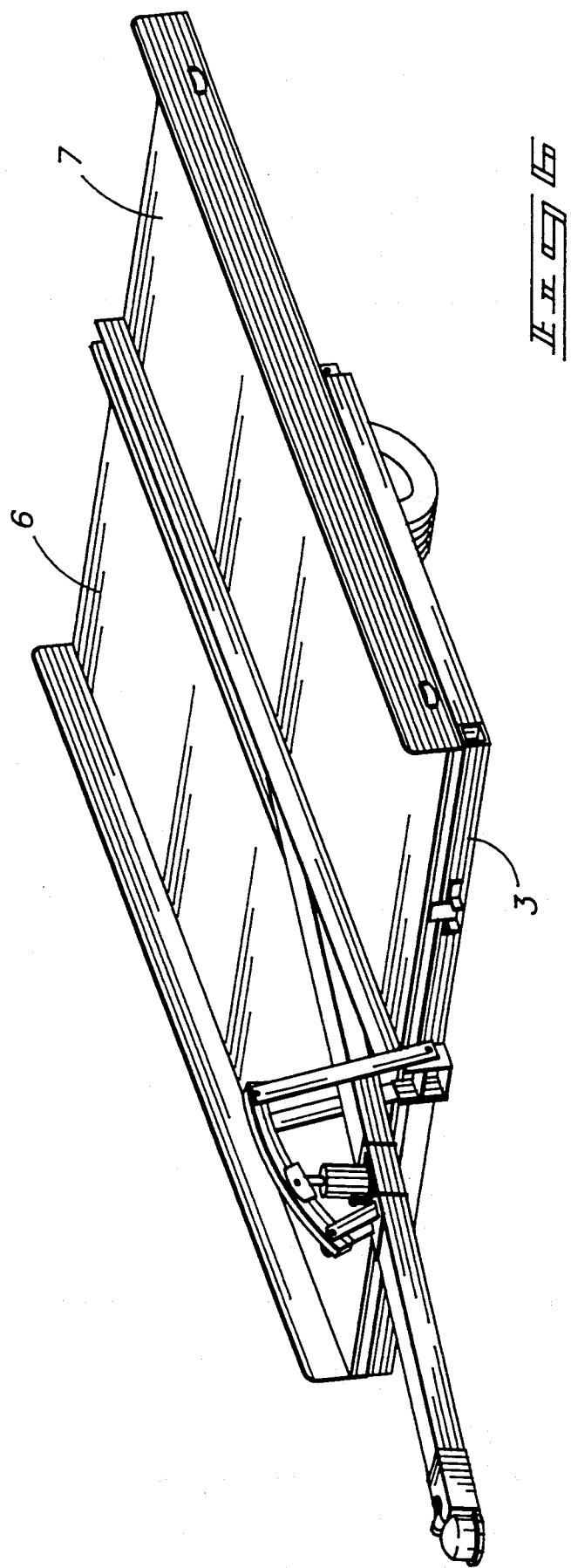

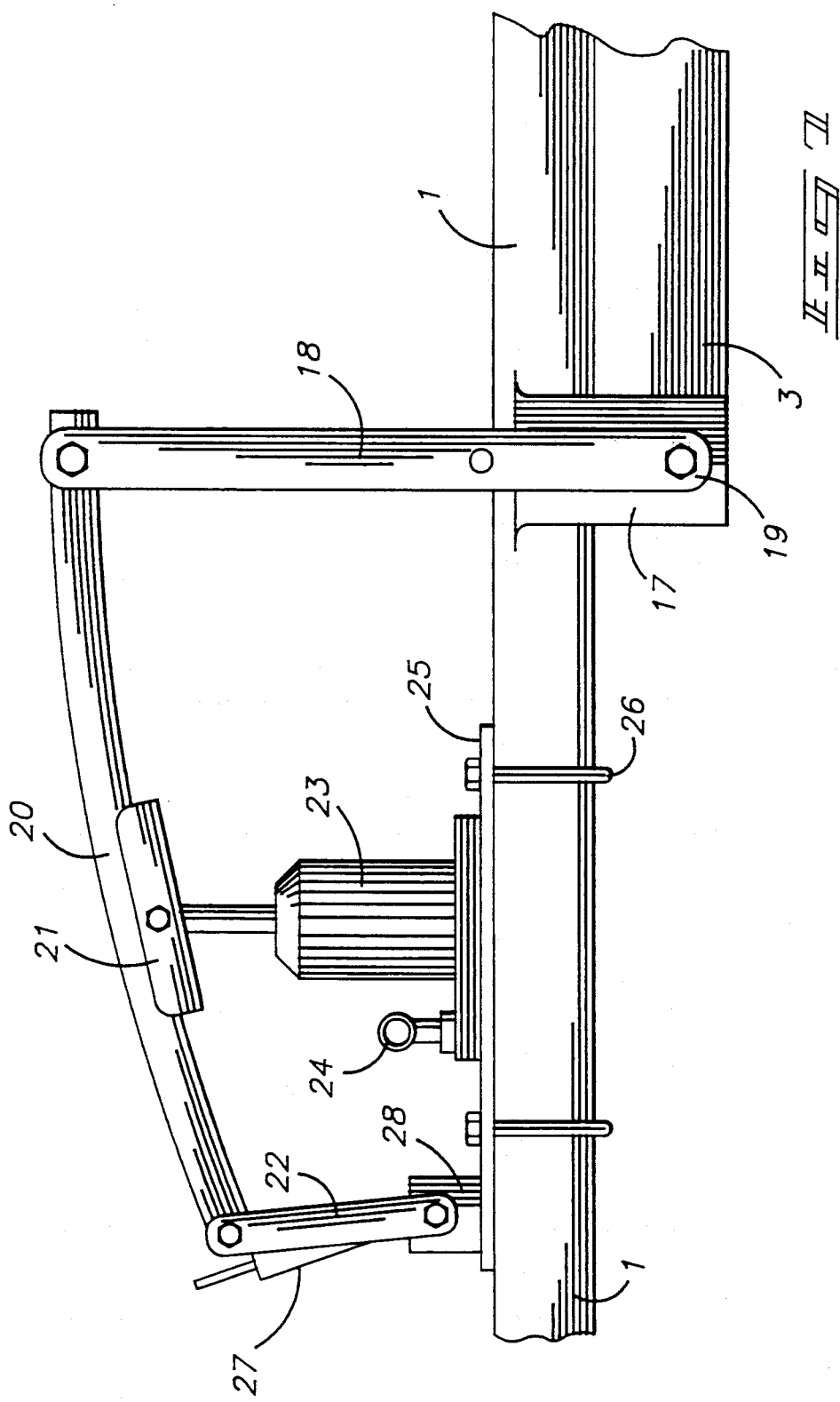

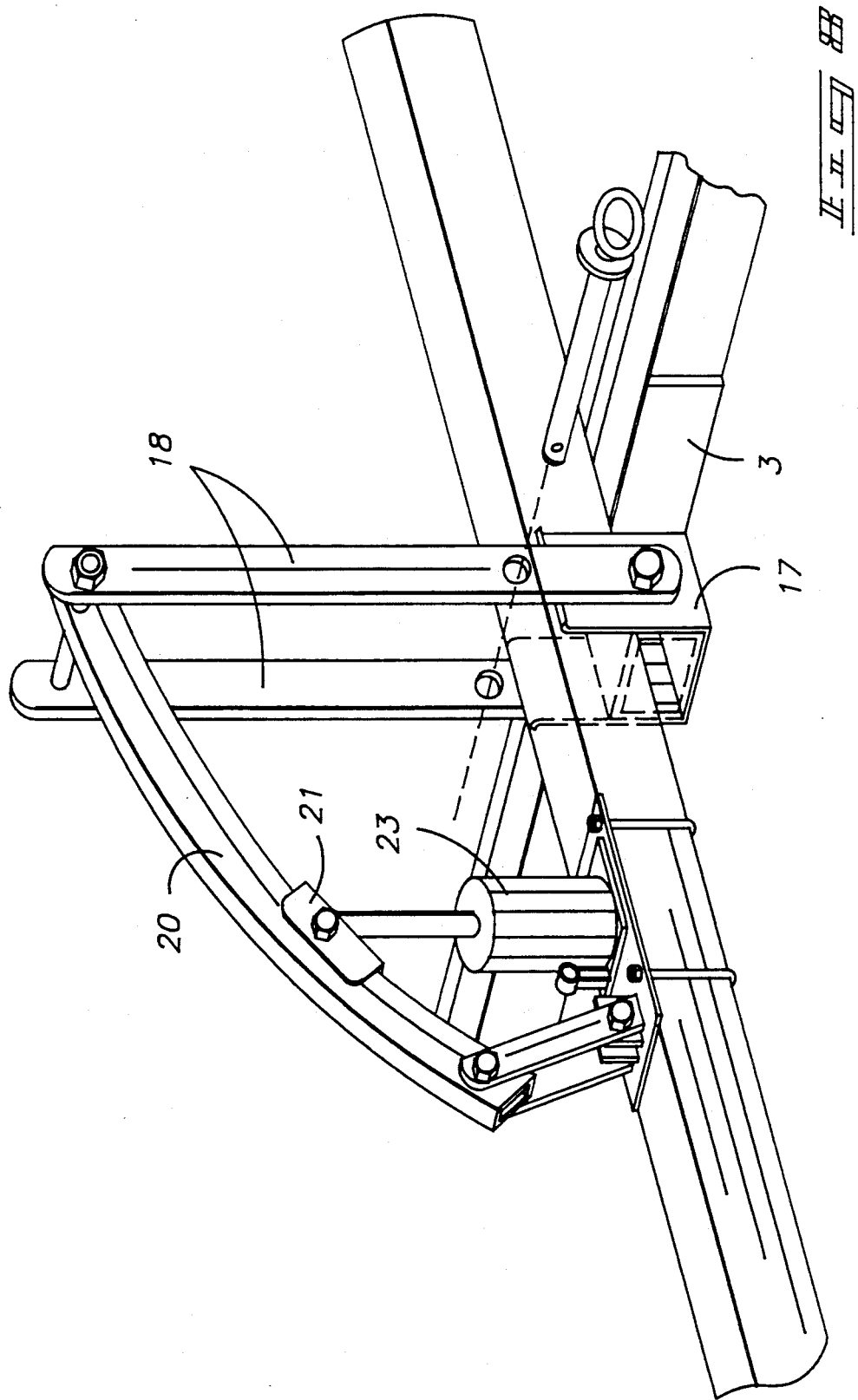

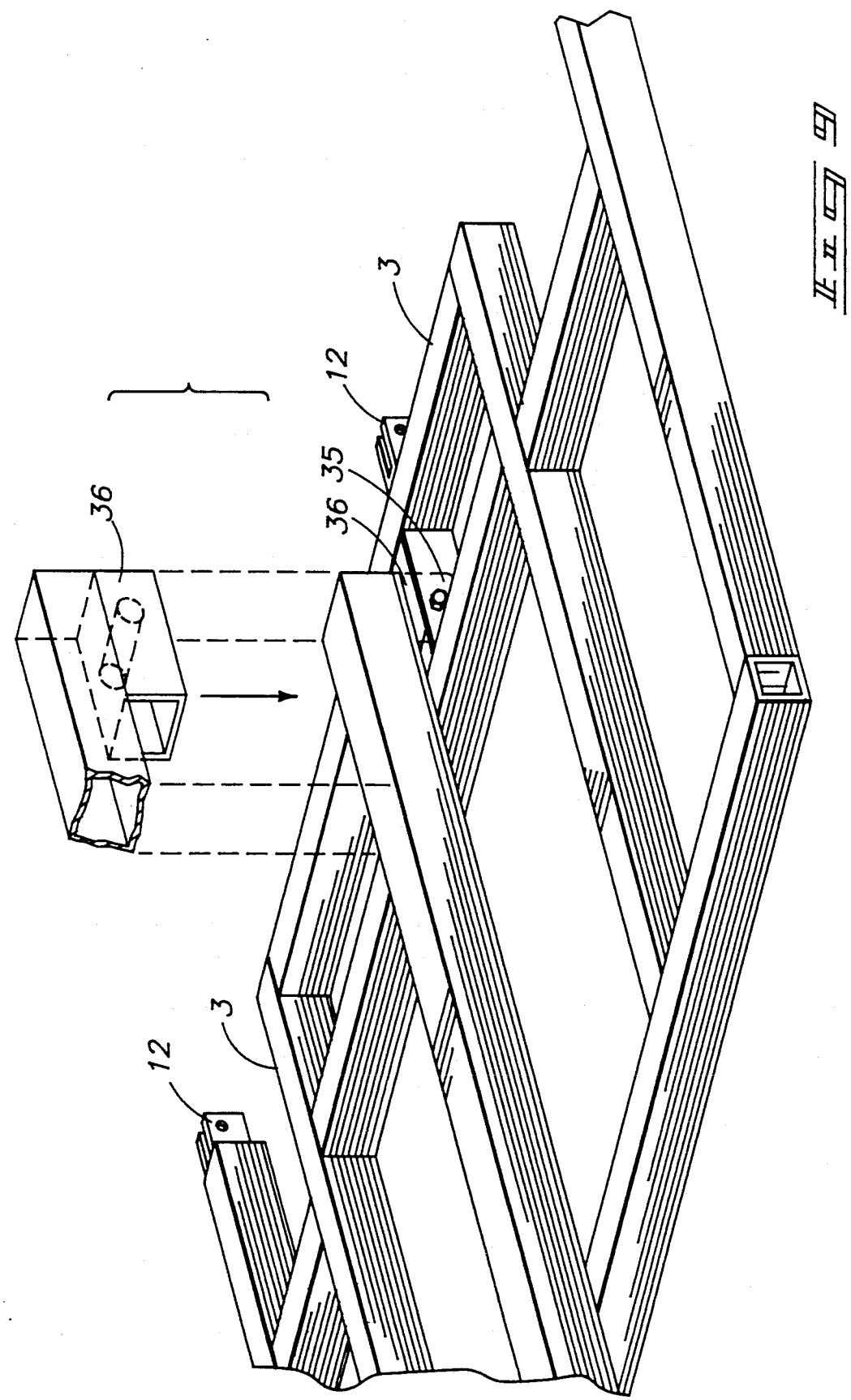

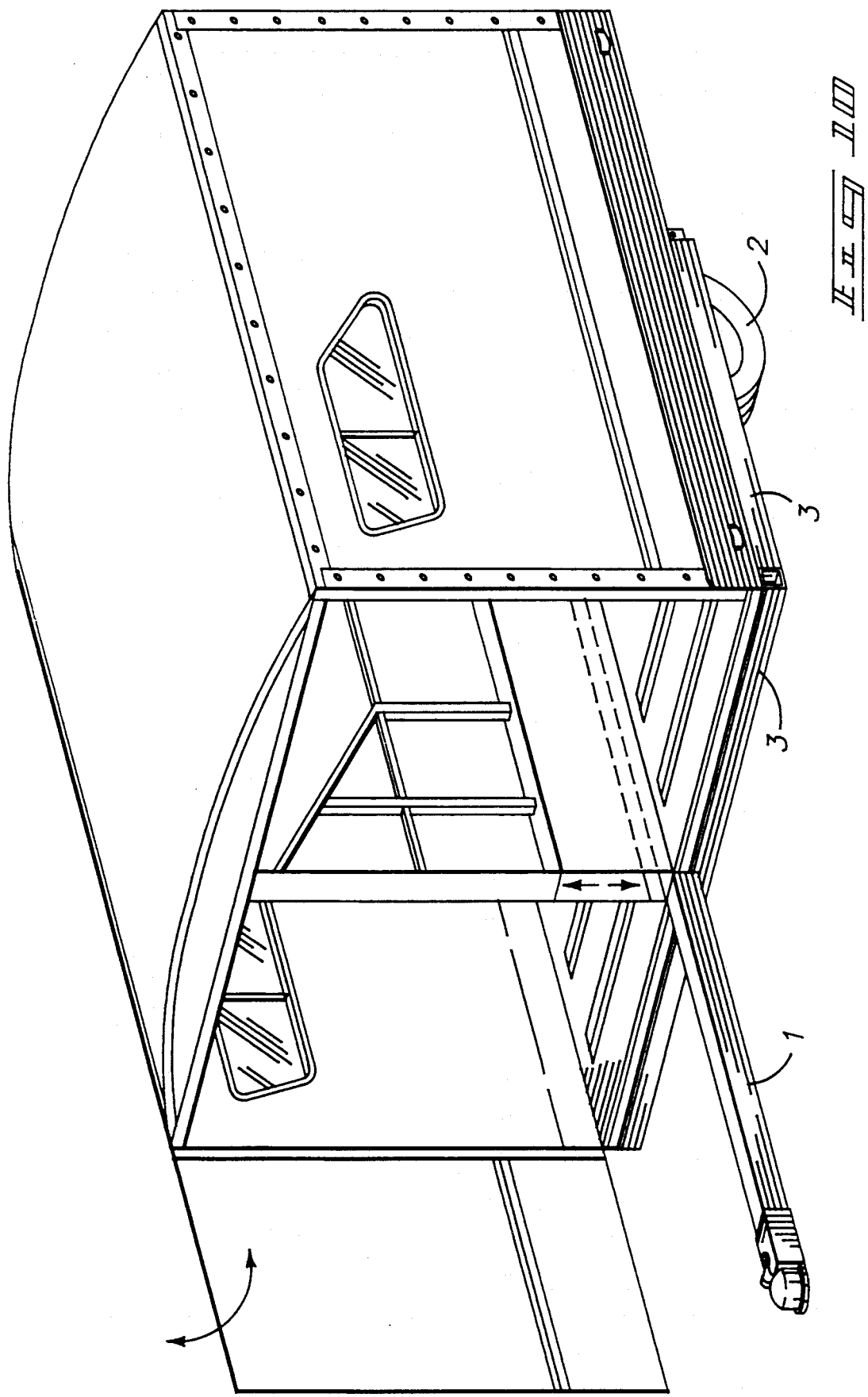

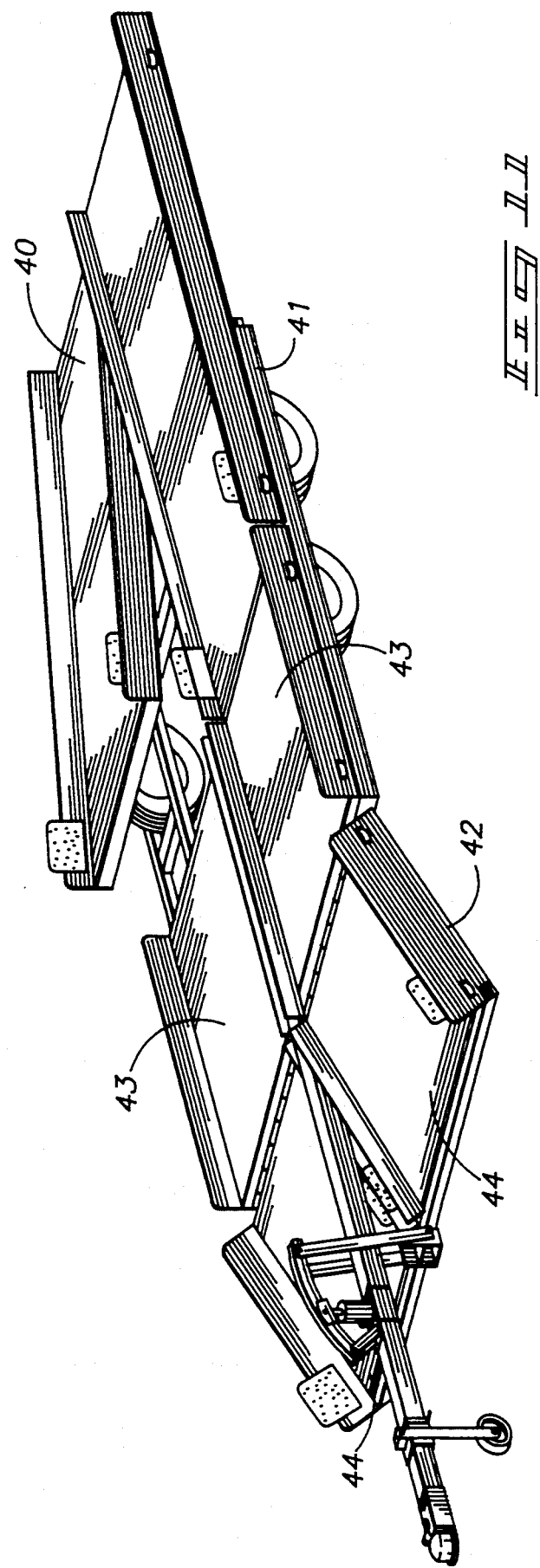

TRAILER WITH TILTABLE BED(S)

FIELD OF THE INVENTION

This invention generally pertains to trailers and other hauling means with one or more tiltable platform beds.

BACKGROUND OF THE INVENTION

For many years there have been numerous attempts to develop trailers for a variety of applications that are physically and functionally easier to load and unload. Such applications include, without limitation, trailers for snowmobiles, all-terrain vehicles ("ATV'S"), tractors, golf carts, lawn and garden equipment, horses and other livestock. The difficulty in loading and unloading the various trailers increases as the weight and length of the load increases, especially when physical labor is required.

Trailers adapted for transporting snowmobiles are illustrative of some of the difficulties and problems incurred in loading and unloading trailers, especially if two or more snowmobiles are involved. The average snowmobile weighs in excess of 400 pounds, more than the average person can lift or handle. A typical trailer for transporting one or two snowmobiles is a single bed trailer, which must be loaded and unloaded from its rear end, such as the multipurpose trailer in Salamander, U.S. Pat. No. 4,273,351.

Generally, to place the load on the trailer, one must traverse the gap between the ground and the trailer and then move the load forward so that the trailer can be placed into the transport position. This is preferably done by driving the load onto the trailer, but in some cases is done by physical labor. If the center of gravity of the load is placed too far forward, the platform or bed will be abruptly rocked forward and the second snowmobile cannot be loaded.

The difficulty in loading the trailer substantially increases when two units are present, such as two snowmobiles. The loading of the first snowmobile must not place the weight far enough forward to tilt the platform bed into the transport position so the second snowmobile cannot be loaded. The loading of the second snowmobile must be accomplished by driving the second snowmobile onto the tilted platform and then moving the two snowmobiles forward to tilt the entire load into the transport position.

In order to load (and unload) many trailers, the towbar must be unhitched from the tow-vehicle and the trailer manually tilted back. If some form of a detachable ramp is not used, there is generally an unacceptable gap between the trailer and the ground which must be traversed during the loading and unloading process. In other cases, separate ramp means must be brought along and set up to load and unload the trailer, adding to the weight of the trailer and to the required physical labor and time.

Unloading presents similar problems since unloading generally must be accomplished in a reverse manner and at the rear end of the trailer. In the case of snowmobiles, unloading is much more difficult because most snowmobiles do not have a reverse mechanism and unloading must therefore be accomplished manually.

Unloading on the rear side of the trailer is likewise more difficult in the application of a horse or other livestock trailer and involves increased safety risks to both the livestock and to the person unloading the livestock.

The many industry attempts to ease the loading and unloading process and the problems and difficulties associated therewith have heretofore not sufficiently done so, and some have in fact created additional problems. Such attempts have included complex designs and many additional parts and hence additional cost and weight that they can only be justified for very heavy and large loads.

Other past industry efforts have included platform beds that are rotated or pivoted to allow the loads to be driven forward off the trailer. These attempts generally had an unacceptably abrupt drop-off from the trailer to the ground, resulted in various safety problems while in transit and did not sufficiently reduce the problems and difficulties.

Attempts have also been made to utilize two side-by-side platform beds that tilted downward at generally only the rear end. Although these trailers allowed independent loading of two loads from the rear end, the loads still had to be unloaded in the opposite direction back down the rear end, and had the problems associated therewith.

One reason prior attempts have failed to achieve a bed that tilts sufficiently downward at both ends is that they have not configured the frame means so that it is releaseably suspended from the towbar means or tongue, which allows the frame and consequently the platform bed(s) to be tilted downward at the front end. This feature of this invention allows the load to be loaded or unloaded at either the front end or the rear end of the platform bed(s).

This invention has greatly reduced the problems and difficulties associated with loading and unloading trailers by providing a trailer with a platform means which tilts downward at both the front end and the rear end, and therefore serves as both the platform means and the ramp means. This feature is accomplished by releaseably suspending the frame means from the towbar.

This invention has also greatly reduced the labor requirements and safety problems associated with some trailers by eliminating the need to unhitch and remove the trailer from the tow vehicle during loading and unloading. This invention accomplishes this by providing for a means to tilt the platform bed to serve as the ramp means in either direction and with a sufficiently long towbar means to yield the necessary clearance to unload without interference from the tow vehicle.

This invention has greatly reduced or eliminated the safety and other problems related to unloading on the same side the trailer was loaded and allows each load to be independently loaded in the forward direction and independently unloaded in the forward direction. In the horse trailer application, this invention allows the person to walk the horse off the front end of the trailer instead of backing it off the rear end, thereby reducing the safety risk to animal and the person. In the snowmobile trailer application, this invention allows the operator to drive the snowmobile on either the front end or the rear end of the trailer to load it and to then drive it off the other opposite end to unload.

This invention has also eliminated the need for a separate ramp means by utilizing the platform means as the ramp means, and has achieved a relatively low slope for the ramp means.

This invention has greatly reduced the problem associated with balancing the load during loading and unloading of two or more units by also providing for two or more platform means, which allows independent loading and unloading of more than one load.

This invention is distinguished from prior art individually or any combination thereof by providing an apparatus which eliminates the problems relating to all prior art as discussed more fully herein.

SUMMARY OF THE INVENTION

It is an object of this invention to reduce the risk of property damage and personal injury during the loading and unloading of trailers and to make loading and unloading quicker, easier and less physically demanding. This invention features a platform means which can be tilted downward at both its front end and at its rear end, without unhitching the towbar from the tow vehicle. This invention also features a frame means releaseably attached to and suspended from the towbar means. This invention has the advantage of the ability to load or unload the trailer from either its front end or its rear end, with less physical labor, less safety risk and without having to accomplish the unloading in reverse.

It is an object of this invention to provide a trailer upon which more than one load can more easily and independently be loaded and balanced. It is a feature of this invention to have two or more platform means which can be independently tilted downward at either the front end or the rear end of the trailer, while the trailer is still hitched to the towing vehicle. Utilizing more than one independent platform means has the advantage of greatly reducing the problems associated with balancing the trailer while attempting to load more than one load and reducing the balancing problems associated with unhitching the trailer from the tow vehicle and then re-hitching it once loaded.

It is an object and feature of this invention to provide a trailer which can be loaded and unloaded by driving or leading the load in the same direction, that is, driving or leading the load on the trailer at the rear end and then off the front end, without requiring a separate ramp means. It is an advantage of this invention that more than one load can be independently loaded, secured, transported and unloaded in the same direction and from either the front end or the rear end.

It is a further object of this invention to provide such a trailer meeting the objects stated herein without an unnecessarily complex design and without requiring an excessive number of parts and therefore, excessive weight and expense. This invention features a versatile and economical design relative to most trailers in use and a design which can be applied to and reduce the problems for many different specific applications.

It is another object of this invention to provide a trailer which accomplishes the objects stated herein and is versatile enough so it can be used for several different applications.

Other objects, features and advantages of this invention will appear from the specifications, claims and accompanying drawings which form a part thereof. In carrying out the objects of this invention, it is to be understood that its essential features are susceptible to change in design and structural arrangement with only one practical and preferred embodiment being illustrated in the accompanying drawings, as required.

BRIEF DESCRIPTION OF DRAWINGS

In the accompanying drawings which form a part hereof:

FIG. 5 is a perspective view of one application of the invention, without the platform means and with the frame means in the down position;

FIG. 6 is a perspective view of the dual-bed application of the invention and with the frame means in the down position;

FIG. 7 is a side view of one example of a lifting and lowering means which can be used with the invention;

FIG. 8 is a perspective view of one example of a lifting and lowering means and one means to suspend the frame means from the towbar means;

FIG. 9 is a perspective view of one example of a means to releaseably suspend the frame means from the towbar means;

FIG. 10 is a perspective view of an application of this invention to a housed horse or other livestock trailer; and FIG. 11 is a perspective view of an application of this invention to a trailer with a capacity to easily load, transport and unload three or more units.

DESCRIPTION OF THE PREFERRED EMBODIMENT

This invention generally pertains to a trailer that is easier to load and unload and accomplishes this by releaseably suspending the frame means from the towbar means, thereby allowing the platform means to be tilted downward for loading or unloading at both its front end and its rear end.

Many of the fastening and connection means and other components utilized in this invention are widely known and used in the field of the invention described, and their exact nature or type is not necessary for an understanding and use of the invention by a person skilled in the art or science, and they will not therefore be discussed in significant detail.

The various components shown or described herein for any specific application of this invention can be varied or altered as anticipated by this invention. This invention comprises a unique combination of elements, each element of which can be accomplished by one of several different means or variations for a specific application of this invention. The practice of a specific application of any element may already be widely known or used in the art or by persons skilled in the art or science and each will not therefore be discussed in significant detail.

Figure 1:
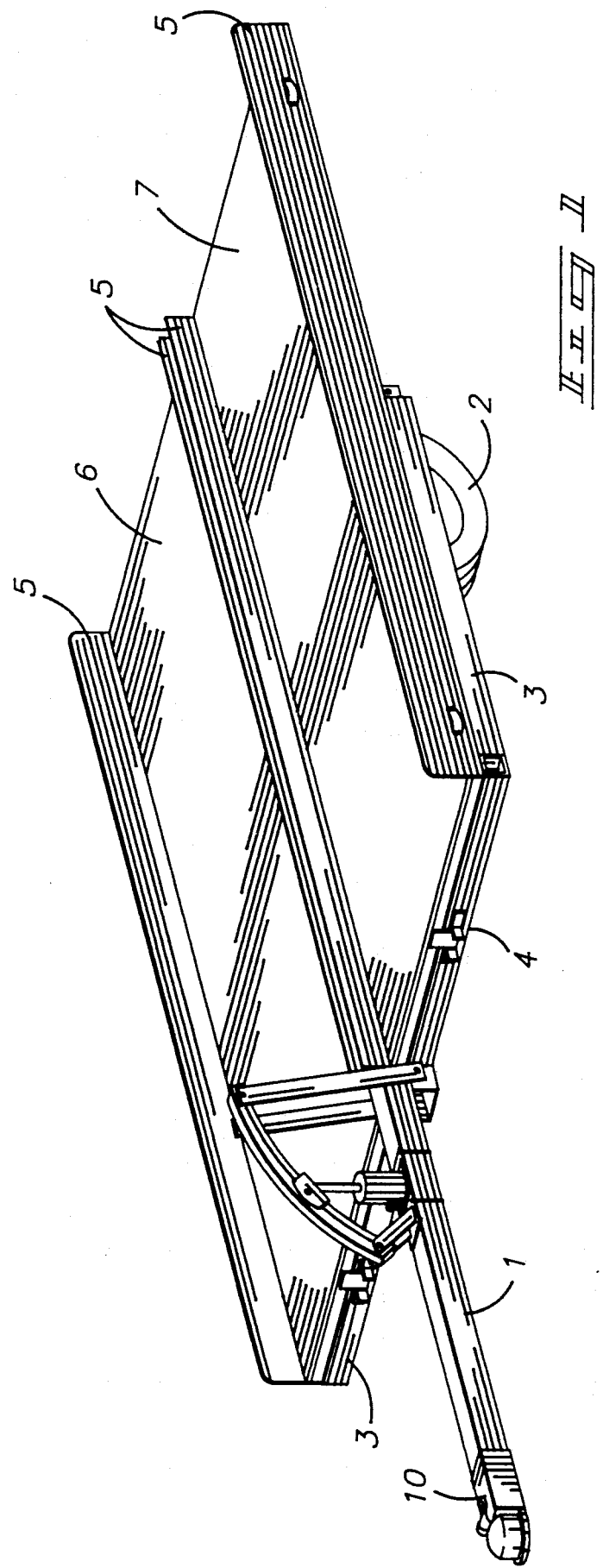
FIG. 1 is a perspective view of a dual-bed application of the invention in the transport position.

FIG. 1 shows a side-by-side dual-bed application of the invention in a position ready for transport. One end of the towbar means 1 or tongue is attached to the coupler means 10 to facilitate connection to whatever tow vehicle is being used. The other end of the towbar means 1 is connected to the frame means 3, as shown more fully in FIG. 9. The towbar means 1 can also be attached to the wheeled undercarriage means 2.

The towbar means 1 as contemplated by this invention can be made and used by several different means, utilizing different specific shapes, configurations, components, connection means to the towing vehicle and connection means to the wheeled undercarriage means 2. The component used for the towbar means 1 application shown in the drawings is generally comprised of a square or rectangular tube member. The wheeled undercarriage means 2 as contemplated by this invention can be accomplished by several different combinations of structural members, wheels and means for connection or attachment to the other components of this invention.

FIG. 1 also shows the frame means 3 is releaseably fastened to and suspended from the towbar means 1, examples of which are shown more fully in FIG. 7 and FIG. 8. The frame means 3 is also attached to the wheeled undercarriage means 2 such that the frame means 3 can rotate or pivot radially relative to its points of attachment, thereby allowing its front end to be lowerable to the ground.

In FIG. 1, the first platform means 6 and the second platform means 7 are independent of one another and can be attached to either the frame means 3 or to the wheeled undercarriage means 2 such that the two platform means can be tilted downward at either the front end or the rear end of the trailer. To secure the first platform means 6 and the second platform means 7 to prevent their rotation when not desired, platform securing means 4 fastens the platform means to the tilting frame means 3. The two platform means can also be attached or secured to the towbar means 1.

The platform securing means 4 application shown is comprised of a pin through a retaining hole and over a hook shaped member.

The side rails 5 as shown in FIG. 1 may, but need not be, attached to the sides of the first platform means 6 and/or the second platform means 7 for added load control.

Figure 2:
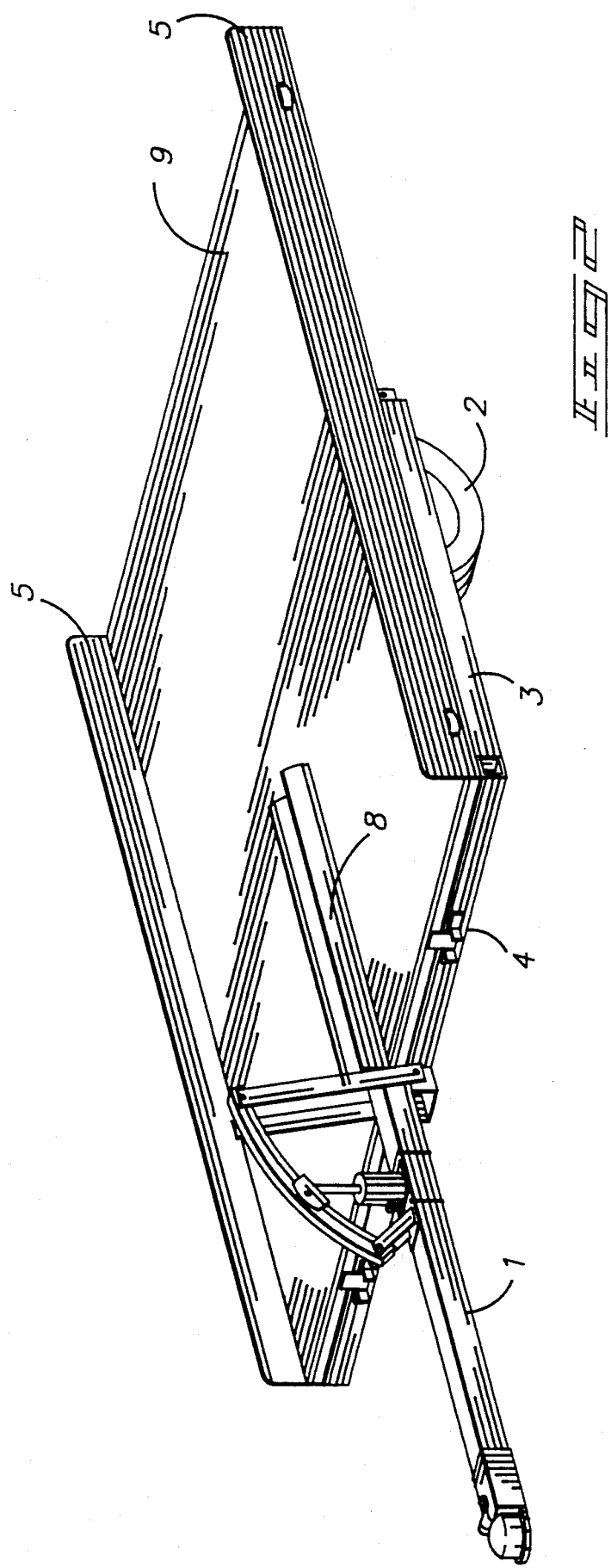
FIG. 2 is a perspective view of a single-bed application of the invention in the transport position.

FIG. 2 shows an application of the invention with only one platform means 9 and in a position ready for transport. The platform means 9 can be used and would function similar to the first platform means 6 and the second platform means 7 shown in FIG. 1. Center rails 8 may also be included for added load control.

Figure 3:
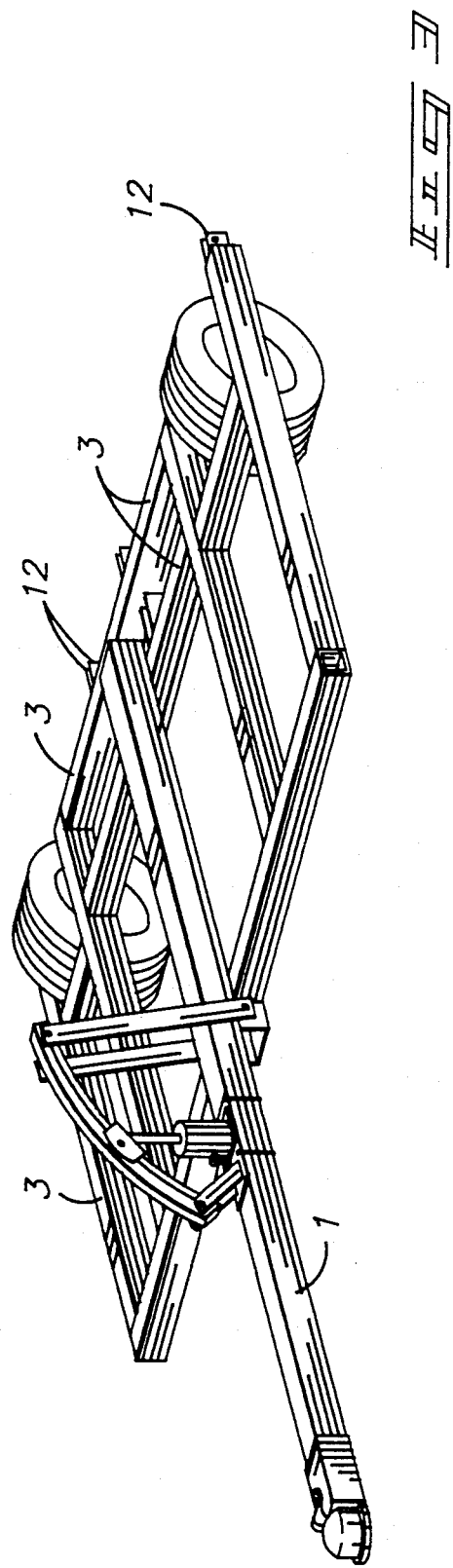
FIG. 3 is a perspective view of one application of the invention without the platform means, and in the transport position.

FIG. 3 shows an application of the frame means 3 of the invention in the upright or transport position and with the platform means deleted from the view. This shows an example of a configuration for the frame means 3 that can be utilized for the dual-bed application or the single bed application of the invention and shows an example of a configuration of the frame means 3 relative to and releaseably suspended from the towbar means 1.

While FIG. 3 shows one example of a frame means 3 that can be used to practice the invention, any number of other configurations for a frame means 3 can be used within the contemplation of this invention. The frame means 3 as contemplated by this invention can be accomplished by welding square or rectangular tube members together in the pattern shown in FIG. 3, or any number of other possible patterns to best meet the specific application.

This invention also contemplates that the first and second platform means can also act as their own frame support means and themselves be releaseably attached to and suspended from the towbar means 1. The attachment and suspension of the frame means 3, or the platform means if a separate frame means 3 is not used in the particular application, from the towbar means 1 may also be accomplished in several different ways, including suspending the frame means 3 or platform means beneath or at the same level as the towbar means 1.

The platform means could be attached to the frame means shown in FIG. 3 at the pivot parts 12 by bolting a component of the platform means between the two parallel components of the pivot parts 12 such that the platform can pivot about said points of attachment. The platform is secured for transport and thereby prevented from pivoting by the platform securing means 4, as shown in FIGS. 1 and 2.

Figure 4:
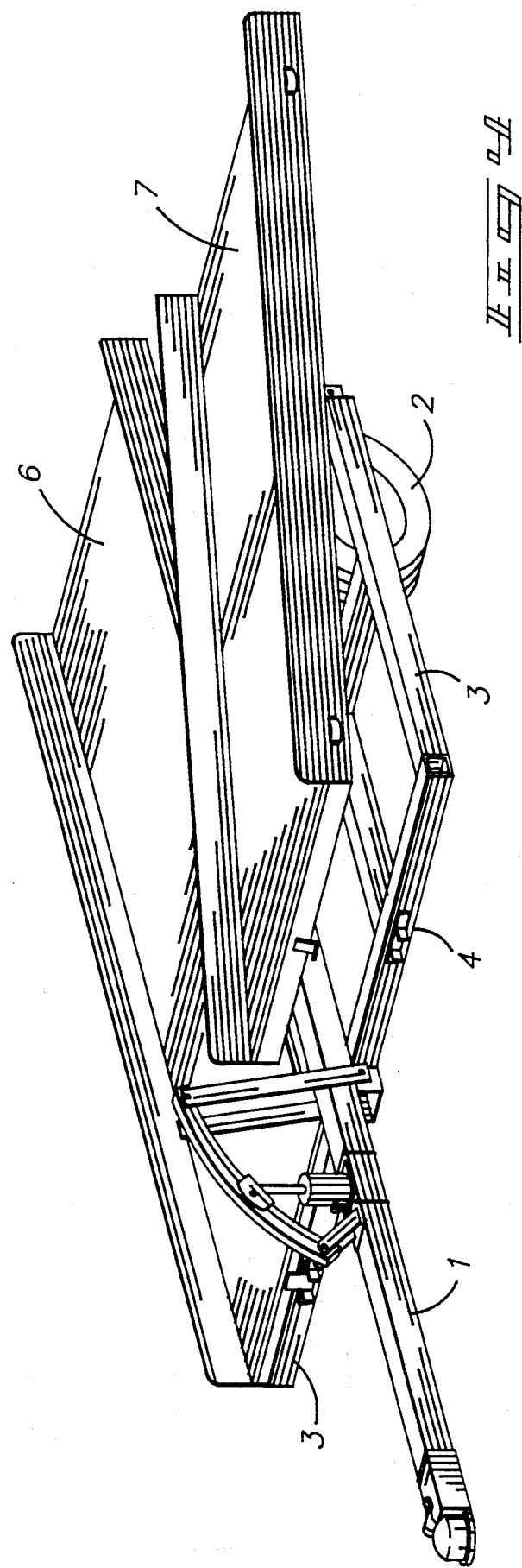
FIG. 4 is a perspective view of the dual-bed application of the invention, with one of the platform means in a position ready to load from the rear end.

FIG. 4 shows a dual-platform bed application of the invention with the frame means 3 in the up position and the second platform means 7 pivoted or tilted downward at its rear end. With the second platform means 7 in this position, it can be independently loaded or unloaded from its rear end using the second platform means 7 as the ramp means and without unhitching the trailer from the tow vehicle.

FIG. 5 shows an example of the invention with the frame means 3 in the lowered position at its front end and with the platform means deleted from the view.

FIG. 6 shows a dual-platform application of the invention with the front end of the frame means 3 in the lowered position and with the first platform means 6 and the second platform means 7 secured to the frame means 3. In this position, the trailer can still be hitched to the tow vehicle and can be unloaded off the front end using the first and second platform means as the ramp means.

For a dual-platform snowmobile application of the invention, one snowmobile can be driven onto the second platform means 7 when the trailer is in the position shown in FIG. 4. The other snowmobile can then be similarly and independently loaded onto the first platform means 6. The snowmobiles can then be unloaded by simply driving them off the trailer by lowering the frame means 3 into the position shown in FIG. 6.

FIG. 7 shows one example of a lifting and lowering means that may be used to lift and lower the frame means 3. The lifting and lowering means as contemplated by this invention can be accomplished in several different ways, including, without limitation, manually, hydraulically, mechanically, electromechanically, electrically, etc.

The lifting and lowering means shown in FIG. 7 utilizes a hydraulic jack 23, which includes a pump component 24. The hydraulic jack 23 is mounted on a baseplate 25, which is securely fastened to the towbar 1. The hydraulic jack 23 is attached to reinforcement plate 21, which is attached to a lifting arm 20. The lifting arm 20 is attached at one end to the pivot link 22, which is also attached to the baseplate 25. The other end of the lifting arm 20 is attached to two lifting links 18 such that it can pivot relative thereto and as shown more fully in FIG. 8.

FIG. 8 shows the other end of the lifting arm 20 attached to two parallel lifting links 18, which are attached to the frame means 3, in this example by bolt 19. Rectangular guide plates 17 are positioned between the lifting links 18 and the portion of the frame means 3 to which the lifting links 18 are attached.

FIG. 9 shows one means to attach the towbar means 1 to the frame means, that is, by welding two parallel plates 36 to the towbar means 1 and placing a bolt through the two parallel plates 36 and through a portion of the frame means 3.

FIG. 10 shows one application of this invention to a housed horse or livestock trailer. The housing portion is adaptable to the particular application and is attached to the platform means.

FIG. 11 shows an application of this invention to a higher capacity trailer. The two rear platform means 40 are attached to fixed frame means 41 such that the platform means 40 can be tilted downward at their rear end, for loading. In this type of application of the invention, there can be intermediate platform means 43 for additional platform space.

The front frame means 42 is releaseably attached to and suspended from the towbar means 1 as described herein for other applications of the invention and the front platform means 44 are attached to the frame means 42.

While the preferred embodiment for the invention has been described in detail, those familiar with the art to which this invention relates will recognize various alternative designs and embodiments for carrying out the invention, as defined by the claims which follow.

The invention claimed is:

1. A trailer which comprises:
   a towbar means attached at its rear end to the rear end of a frame means and attachable at its front end to a towing vehicle;
   said frame means is attached to and supported at its rear end by a wheeled undercarriage means and, at its front end, is securely attachable to and detachable from said towbar means from underneath the towbar means, such that when the front end of the frame means is not attached to the towbar means, it can be lowered to the ground; and
   one or more platform means attached to said frame means such that each of said platform means can independently be tilted downward at the front end and the rear end of each of said platform means.

2. A trailer as recited in claim 1 and further comprising:
   a means to lower the front end of the frame means from the elevational level at which it is securely attached to said towbar means to ground level.

3. A trailer as recited in claim 1 and further comprising:
   a means to raise the front end of the frame means from ground level to the elevational level at which it can be securely attached to said towbar means.

4. A trailer which comprises:
   a towbar means attached at its rear end to the rear end of a frame means and attachable at its front end to a towing vehicle;
   said frame means is attached to and supported at its rear end by a wheeled undercarriage means and, at its front end, is securely attachable to and detachable from said towbar means from underneath the towbar means, such that when the front end of the frame means is not attached to the towbar means, it can be lowered to the ground; and
   a first platform means and a second platform means, both attached to said frame means such that each of said platform means can independently be tilted downward at the front end and at the rear end of each of the platform means.

* * * * *